United States Patent [19]

Picard

[11] Patent Number: 5,180,119
[45] Date of Patent: Jan. 19, 1993

[54] VERTICAL LIFT SYSTEM THROUGH TANGENTIAL BLOWING OF AIR JETS CHANNELLED OVER THE TOP OF ROTATING CYLINDERS

[76] Inventor: Jean-Paul Picard, 30 rue Thibault, Hull, Quebec, Canada, J9A 1H3

[21] Appl. No.: 735,312

[22] Filed: Jul. 24, 1991

[30] Foreign Application Priority Data

Jul. 27, 1990 [CA] Canada .................................. 2022087

[51] Int. Cl.$^5$ ............................................. B64C 23/02
[52] U.S. Cl. ..................................... 244/10; 244/12.1; 244/21; 244/206
[58] Field of Search ..................... 244/13, 10, 56, 12.1, 244/12.4, 12.5, 21, 207, 23 R, 23 D

[56] References Cited

U.S. PATENT DOCUMENTS

| | | | |
|---|---|---|---|
| 1,681,067 | 8/1928 | Tarshis | 244/21 |
| 1,879,594 | 9/1932 | Trey | 244/10 |
| 1,887,148 | 11/1932 | Ganahl | 244/207 |
| 1,921,043 | 8/1933 | Roth | 244/23 R |
| 1,927,538 | 9/1933 | Zaparka | 244/21 |
| 2,039,676 | 5/1936 | Zaparka | 244/21 |
| 2,334,070 | 11/1943 | Conley | 244/207 |
| 2,417,358 | 3/1947 | Grose . | |
| 2,922,277 | 1/1960 | Bertin | 244/207 |
| 3,071,334 | 1/1963 | Barnes . | |
| 3,081,964 | 3/1963 | Quenzler | 244/56 |
| 3,092,354 | 6/1963 | Alvarez-Calderon | 244/10 |
| 3,172,116 | 3/1965 | Serriades | 244/12.1 |
| 3,463,417 | 8/1969 | Cruz | 244/207 |
| 3,630,470 | 12/1971 | Elliott . | |
| 4,498,645 | 2/1985 | Hardy | 244/13 |

FOREIGN PATENT DOCUMENTS 8907073 8/1989 European Pat. Off. .
637289 4/1928 France ................................. 244/10

Primary Examiner—Galen Barefoot

[57] ABSTRACT

This invention pertains to a means of aerial lift depending on the use of an air jet blown and channelled (through a nozzle and a vane) exclusively and almost tangentially over a limited segment of a rotating cylinder (a Magnus cylinder) thereby creating a useful depression and lift. The part of the cylinder's surface swept by such jet (which part we will name the "useful segment") is delimited upstream by a nozzle "splitting" a sheet of air almost tangentially over the cylinder and downstream by a vane which will skim the surface of the cylinder and direct the jet away from the surface of the rotating cylinder. It is possible to utilize the energy required for pumping the aforementioned jet tangentially over the cylinder much more efficiently than is the case with a classical Magnus cylinder because, instead of the cylinder being immersed totally in the pumped air flux, the jet channelled by the nozzle and the vane of the present invention does not generate any useless or contrary lift, or any sizable zone of turbulence. A large number of accessory devices are also proposed in order to make this principle applicable and useful. In particular, the aforementioned basic element (i.e. cylinder, nozzle and vane) are arranged in several modules and these modules are protected from the wind by a system of walls and louvers. The attitude of an aircraft equipped with such modules is controlled mainly by moving some vanes closer to or farther from the nozzles, with a consequent variation of the surface of the useful segments and thus the lift of these modules.

16 Claims, 6 Drawing Sheets

VERTICAL LIFT SYSTEM THROUGH TANGENTIAL BLOWING OF AIR JETS CHANNELLED OVER THE TOP OF ROTATING CYLINDERS

BACKGROUND OF THE INVENTION

I. Field of the Invention

This invention relates to a new system of achieving vertical lift for an aircraft or other vehicle or machine. More particularly, the invention relates to a device incorporating such a system.

II. Brief Description of the Prior Art

This invention makes use of the effect described by Magnus (1854) according to which a rapidly rotating cylinder immersed within a fluid flux or moving stream will generate a vector perpendicular to this stream. To be more precise, a low pressure zone (depression) appears on the surface of the rotating cylinder and this depression reaches its maximum value where the surface of the cylinder is moving in approximately the same direction as the stream. The lift vector produced in this way is approximately perpendicular to the stream, and directed away from the surface of the cylinder.

Several inventions have been made in which a rotating cylinder is integrated into the leading edge or in the extrados of a classical wing. These inventions are generally aimed only at increasing the lift in standard flight and are not related in any way with the vertical flight which is the purpose of the present invention.

In 1942, Parlee C. Grose invented an aircraft capable of generating vertical lift (U.S. Pat. No. 2,417,358). In this patent, in accordance with the classical description of the Magnus effect, lift is generated by rotating cylinders immersed in a pumped air stream. The cylinders are arranged in symmetrically opposed pairs and are always parallel to the fuselage of the aircraft. The air stream generating the lift is pumped directly onto the cylinders by a motorized blowing system, so the lift is independent of the forward movement of the aircraft. Such an aircraft is consequently able to fly without moving forward or, in other terms, to fly vertically. An aircraft such as proposed by Grose can also be equipped with classical wings which permit standard flight when sufficient forward speed is attained. It seems that this invention was never actually realized.

In 1970, F. T. Elliott was awarded U.S. Pat. No. 3,630,470 for an aircraft using Magnus cylinders. An analysis of this invention shows a turbine/blower located on the top of the aircraft, this blower projecting a stream of air downwardly through a large duct located in the center of the aircraft. This main duct is then subdivided into secondary ducts which in turn meet 90-degree elbows that reorient the secondary air streams horizontally and radially from the center of the aircraft. The Magnus cylinders are installed in these elbows, immersed in the middle of the secondary ducts. Again, it seems that no practical use of this invention was ever made, perhaps because the aforementioned elbows cause a concentration of the moving fluid directly "under" the rotating cylinders, which is exactly the opposite of what must be achieved to obtain maximum useful lift.

In 1963, J. Barnes was awarded U.S. Pat. No. 3,071,334 for a vertical lift aircraft. In an arrangement which bears some resemblance with the above mentioned patent to Elliott, Barnes has designed an aircraft with, right in its center, a large vertical turbine directed downward and then with a baffle which divides and redirects the air flux 90 degrees horizontally in two opposed directions toward the lower lifting structures. These lower lifting structures are either static, curved surfaces like wing extrados or some (Magnus type) rotating cylinders. Unlike Elliott, Barnes states (Column 2, lines 31–36) that a baffle causes the downwardly moving air to move laterally and then over the rotating cylinders. Beside this brief statement, however, there is no other description of this important characteristic. The drawings show that the downwardly moving air is directed against a perfectly flat plate in alignment with the very axis of the rotating cylinders, henceforth this flat plate is perpendicular to the surface of the cylinder at the point they come close to each other. The drawings show a more or less wide gap between the tip of this plate and the surface of the cylinder; there is no indication on how to prevent a portion of the air flow (which arrives to the cylinder with a right angle) from flowing under the cylinder through that gap. The fact that the flux of air hits the cylinder with a right angle, the presence of a gap at the tip of the baffle and the absence of any streamlining in the Barnes device maintains a zone of pressure on the windward side of the cylinder and generates turbulences. This negatively affects the lift coefficient. On the lee side of the cylinder, the absence of any device to remove the air stream away from the surface of the cylinder together with the Coanda effect causes the air stream to stick to the cylinder and go around it. This extends the zone of depression farther around the cylinder, to the detriment of the practical and useful vertical lift generated on the top of the cylinder.

Barnes proposes to control such an aircraft with flaps located right above the lower rotating cylinders, about one radius away from the surface of the cylinders. From the drawings, we see that the leading edge of such flaps are located about 20/30 degrees downstream after a vertical line crossing the axis of the cylinder. Such movable flaps actually channel the air stream between their under surfaces (intrados) and the surface of the cylinders. This is equivalent to directing the flow into a pipe, with a very imperfect contact with the atmosphere, and henceforth without useful depression and lift.

Furthermore, the two lower bow cylinders are bluntly facing the front of the aircraft. As soon as the aircraft moves ahead, the wind generated by this movement would go right against the pumped flow crossing these rotating cylinders, diminishing or cancelling any lift there might be there and thus causing the aircraft to tumble down.

Barnes also has designed some rotating cylinders located on the top of the aircraft (identified by reference numerals 19 and 21 in FIG. 2), just beside the inlet of the vertical turbine and duct. It is said that the air attracted by the turbine will flow first over these rotating cylinders. Unfortunately, experimental evidence show that the air being drawn into a pump cannot be "directed". This drawing of air into a pump or a turbine causes a stream with a form of a fan which is converging from all directions toward the inlet port; this stream has always a very short extension and the speed of this stream is decreasing almost exponentially as the distance from the inlet port is increasing. No practical realization of the Barnes invention is known.

An object of the present invention is to make use of the Magnus effect in an effective and practical way for providing lift in an aircraft, other vehicle or machine.

Another object is to provide a device which maximizes the lift available from Magnus cylinders, thus making the effect of the cylinders more practically useful.

Yet another object of the invention is to overcome some or all of the problems of the prior devices when attempting to make use of lift generated by Magnus cylinders.

SUMMARY OF THE INVENTION

I have discovered that the Magnus effect can be used to greater advantage than is the case for the inventions mentioned above, provided one restricts the area of interaction between the air stream and the rotating cylinder and streamlines the air flow so that this interaction is limited solely to that section of the cylinder where the surface of the cylinder and the air stream both move approximately in the same direction. In other words, in the invention, the rotating cylinder is not completely immersed in the stream; but rather, a narrow nozzle extending for substantially the entire length of the cylinder blows a sheet of air onto the surface of the cylinder with an almost tangential angle of incidence (the air and the surface of the cylinder moving in the same direction). This jet of air sticks to the surface of the cylinder (by the Coanda effect). Farther downstream, a profiled vane skims the surface of the cylinder and directs the air stream away from it, thus limiting the area of interaction of the stream and the cylinder. The nozzle and the vane delimit an arc of the cylinder that I name "the useful segment". On this useful segment (which plays a role resembling the extrados of a classical wing), the air stream generates lift directed approximately perpendicular to the chord of the useful segment. The lift generated by the arrangement incorporated in the present invention is much more effective and intense than the lift generated by a fully immersed cylinder because the channelling and the streamlining of the stream accomplished by the present invention suppress from the surface of the cylinder all other zones of depression or pression, all turbulences, and all lifts and drags which are not pulling in the same direction as the most important depression, namely the depression on the useful segment. Thus, the energy used to pump this air stream is used with much greater efficiency because it no longer generates useless or contrary vectors interfering with the main lift as is the case with immersed cylinders.

The device of the present invention can be used to provide lift in aircraft and in other vehicles and equipment requiring lift. The invention will be described in the following particularly with reference to use in aircraft, but it should be kept in mind that this is not the only application.

The orientation of the lift vector of such a rotating cylinder is approximately perpendicular to the chord of the useful segment. It varies according to the position of the nozzle and the vane, and also according to the speed of the stream and the peripheral speed of the surface. It is obvious that all these factors will usually be set for maximum lift, i.e. perfectly vertical lift. However, I have invented variations which can provide very useful effects, especially to control attitude and movement, and to benefit from built-in permanent stabilizing dihedrals.

LENGTH OF THE USEFUL SEGMENT

The optimum length (as expressed in degrees) of this useful segment or, in other terms, the optimum distance between the nozzle and the vane, is determined by (a) the speed of the stream, (b) the peripheral speed of the cylinder, (c) the thickness of the air sheet, (d) the rugosity of the surface of the cylinders. All these characteristics vary according to the mission of the aircraft (e.g. obligation of noise reduction, etc.). Also, this useful segment can be reduced permanently by the designer or temporarily as needed by the operator of the device (e.g. the pilot of the vehicle) in order to achieve other types of control as explained later. In general, however, the optimum length of the useful length (expressed in degrees) is about 60°.

ORIENTATION AND POSITION OF THE NOZZLE AND VANE

For optimum performance, both the nozzle and the vane should be orientated substantially tangentially to the cylinder (e.g. preferably no greater than 5° from the tangent) and both should preferably be positioned as close as possible to the surface of the cylinder without actually touching the surface. In practice, a small gap is required to allow for irregularities of the cylindrical shape and vibrations of the nozzle or vane, etc. The close spacing and tangential arrangements ensure that a stream of air flows smoothly over only the useful segment of the rotating cylinder.

Diameter of the Cylinders

The diameters of the rotating cylinders is determined by the need to satisfy the following conflicting requirements:

1. It is already well known that the peripheral speed of a Magnus cylinder must be several times higher than the speed of the air stream. If one increases the diameter of a cylinder, not only is the lifting surface increased but the peripheral speed is also increased for any given number of revolutions per minute of the cylinder. A larger but slower cylinder is advantageous as far as sophistication, cost and operation of the bearings are concerned. But a larger cylinder, being bulky, would rarely be an advantage in aircraft design and performance.

2. On the other hand, if one increases very substantially the number of revolutions per minute of the cylinder, in order to attain a peripheral speed 4 or more times faster than the airstream speed, it is possible to achieve a very high coefficient of lift (8.0 Cl or more) with a relatively small expense of extra energy. Such an approach is highly efficient but requires very costly bearings and cylinders with complicated structures and a perfect balance of the cylinder.

The final choice of the diameter will reflect a compromise between a desire for maximum efficiency and the need to keep the cost of construction and operation to a minimum.

End Disks

It is already known that it is desirable to install a pair of end-disks at the extremities of Magnus cylinders so that at each end of such cylinders there be some sort of wall higher than the surface, in order to prevent the ambient air from being attracted laterally by the depression situated on the surface of the cylinder. Such end disks were described by Betz and Prandtl (1925).

Orientation of the Cylinder Axes

In an aircraft lifted by means of the present invention, it is to be expected that the axis of the lifting cylinders will be oriented parallel or almost parallel to the axis of the fuselage of the aircraft when used in such a vehicle (in order to reduce the frontal area of the aircraft). However, two reasons can sometimes justify a different arrangement:

(a) to create a built-in dihedral as described later, and (b) when the vectors generated by the cylinders are used not only for lifting the aircraft but also for moving it forward, it is then preferable to tilt all the cylinders slightly forward (exactly as in the case of the tilted disk of the rotor on a helicopter) in order to keep the fuselage horizontal and thus reduce the drag when the aircraft is flying at its normal cruising speed. In return for this advantage, the whole aircraft will have to keep a tilted-back or nose-up attitude when flying vertically, e.g. for landing and takeoff. The landing gear will preferably have a taller nose wheel strut to facilitate this nose-up attitude on landing and takeoff.

Accessory Devices and Arrangements

I have also provided several devices or arrangements necessary to design a practical embodiment of the abovementioned principle.

Lateral Useful Segment

On a cylinder used mainly for vertical lift, it is possible to install on the side thereof a small lateral useful segment with its own small nozzle and vane; such a device can of course generate a horizontal vector when the pilot activates it.

This horizontal vector can be extremely useful when landing in order to manoeuvre the aircraft without changing its attitude.

Anti-Turbulence Devices

A jet of air projected precisely and exclusively over the surface of a rotating cylinder is subject to two sources of turbulence: (a) through its contact with ambient air which is static, and (b) through its contact with the surface of the cylinder which, according to existing experimentation, must be moving several times faster than the blown jet. This turbulence, mainly coming from contact with the ambient air, generates important cyclic variations of the lift. The turbulence increases in significance as the size of the useful segment increases.

I have discovered it is possible to limit such turbulence and stabilize the lift (a) by introducing some short rectifying vanes in the air stream or (b) by dividing the air stream into two and arranging, above the main nozzles, secondary nozzles that will stratify the sheet of air over the cylinder by projecting a secondary sheet to create a smoother contact with the ambient air or (c) by dividing the air stream and placing secondary nozzles in the middle of the useful segment, thus re-energizing the primary air stream and shortening the area where turbulence develops.

Protection of the Jets

In an aircraft equipped with the lifting cylinders described above, it is necessary that the zone just above the useful segment be in contact with the atmosphere if we wish to obtain useful lift from the depression generated on the surface of the rotating cylinder. However, while this link is established between the useful segment and the atmosphere, at the same time it must be ensured that wind coming from the forward movement of the aircraft will not deviate or slow down the air stream projected by the nozzle and thus diminish or suppress the lift.

I have provided ways to establish this contact with the outside air without perturbation over the useful segment by providing a system of walls and louvers around the lifting components. The walls must be far enough from the useful segment and the vane so that they will never be contacted by the blown airstream or by any resulting induced airstreams. The link between the air above the useful segment and the atmosphere is made through louvers. These louvers must be arranged in such a way as to be the least exposed to the wind generated by the forward movement of the aircraft; most of the time, they will not face ahead. Each blade of these louvers will be curved aftward.

These louvers will also allow the air streams involved in the generation of the lift to circulate easily within and away from the walls of the enclosure. To satisfy these requirements, there should preferably be at least two series of louvers. A first series should preferably be located behind or above the nozzles in order to feed the secondary air stream that will be induced by the main jet exiting the nozzles. A second series should preferably be located downstream, after the vane; these last louvers should desirably be large enough to permit the pumped stream to leave the enclosure at one end, and the ambient air to move back and forth slowly but freely between the enclosure and the atmosphere at the other end.

Three Dihedrals

I have provided three different ways to give an aircraft some built-in (or passive) stabilizing dihedrals: these dihedrals can be effective laterally (anti-roll) and longitudinally (anti-pitch).

When two lifting cylinders are located symmetrically on each side of the centre of gravity, the vectors of their lift can be tilted slightly toward each other, thus forming a dihedral. This tilting can be achieved either (a) by inclining the axis of the cylinders or (b) by moving the useful segments symmetrically toward each other (i.e. moving nozzles and vanes together). Depending on the number of cylinders on such an aircraft, this tilting can be done laterally or longitudinally.

It is also possible to build a pair of cylinders with cones at their ends. Of course on the cone the lift vector is tilted, being perpendicular to the surface of the cone. Any cone must come with its facing "twin" and all these arrangements must be symmetrically balanced around the centre of gravity. Once again, these cones are anti-yaw or anti-roll according to whether they are installed laterally or longitudinally.

Modules

Most of the time, each aircraft will have several lifting modules, with each module constituting a complete lifting system as described above (i.e. a rotating cylinder, a nozzle, a vane and the other rectifying devices, etc.). The length of these modules is dictated by the mission of the aircraft.

Location of the Modules

The location of the modules must satisfy the following requirements, which are either mandatory or optional.

(a) To be able to achieve a stationary or vertical flight, it is mandatory that the modules be located symmetrically on each side of the center of gravity to maintain a balance both laterally and longitudinally.

(b) In order to reduce the front surface of the aircraft, it is desirable that most modules be aligned longitudinally, in the same direction as the fuselage axis.

(c) In order to give the aircraft a built-in stability or equilibrium, it is recommended that most useful segments should be located above the center of gravity of the aircraft, which will give it a "pendulum" behaviour.

(d) When the nozzles blow over the cylinder, the jets not only generate some vertical lift but they also generate a residual horizontal thrust. In order to achieve a stabilized vertical flight, it is recommended to dispose the lifting modules in opposite directions so that their contrary horizontal thrusts will cancel each other.

e) In an aircraft whose mission is to carry a bulky load requiring a sling with no preoccupation for speed (e.g. a flying crane), it is recommended to pile up the lifting modules on top of each other with the proviso that there be no mutual interference of air flow from their admission and exit louvers. This stacking of the lifting modules has the advantage that they can be linked together with structures "in tension" which are lighter and safer than cantilever structures.

f) To compensate for the aft/bow shifting of the center of gravity or to control the attitude of the aircraft, it is possible to add at each end of the fuselage some smaller compensation modules with their axis oriented left-right. On such modules, both controlled independently, the pilot can modify not only the intensity of the lift (through variations of the surface of the useful segment or variation of the speed of the air stream) but he can also modify the orientation of the lifting vector by simultaneously moving the nozzle and the vane in unison.

Site of the Useful Load

When the useful load must be inside the aircraft, the designer has two main options. There is an obvious advantage in positioning the load directly under the lifting modules. With this arrangement it is possible to use structures in tension which are lighter and safer than cantilever structures. However, such an arrangement implies that the aircraft will have two levels: an upper level with the lifting modules and a lower level underneath with the useful loads. This arrangement has the disadvantage of a large frontal area and therefore significantly more drag. For these aircraft where a lesser drag and smaller frontal area are sought, the lifting modules can be located on the same level as the useful loads with a cantilever or semi-monocoque structure to hold them together.

General Comments

In this invention there can be much variety as to the type of air pump or turbine, its source of energy, its site, and the type of link between the pump and the nozzles; these are determined by the mission of the aircraft. As a large number of existing and tested technologies can perform these functions, it is believed to be unnecessary to provide more details of these components in the accompanying drawings. The same remark applies to the motors driving the cylinders and to the means of transmission between these motors and the cylinders (hydraulic, pneumatic, belt drives, etc.).

DETAILED DESCRIPTION OF PREFERRED EMBODIMENTS

Figure 1:
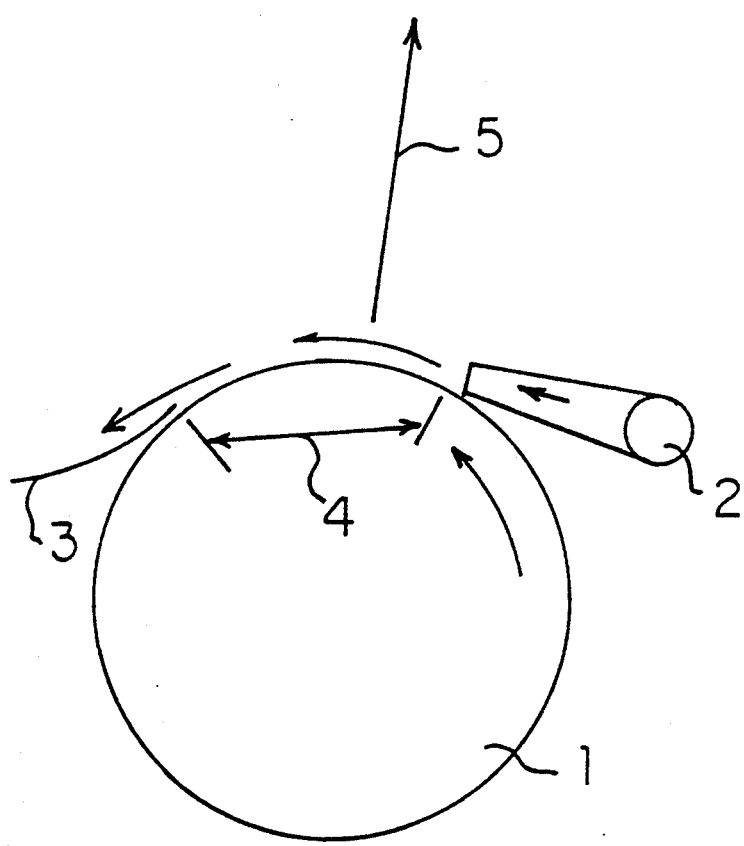
FIG. 1 is a sketch illustrating the basic principle of the present invention.

In FIG. 1, a rotating cylinder 1 turns in the direction of the arrow at several thousand revolutions/minute. A nozzle 2 projects a jet of air at an almost tangential angle onto the cylinder surface, which jet "sticks" to the surface of the cylinder (by the Coanda effect). The surface of the cylinder 1 is moving in the same general direction as the jet of air, at a speed at least 4 times faster than the jet of air. A streamlined vane 3 separates the air jet from the surface of the cylinder 1. The "useful segment" 4 of the cylinder is that zone on the surface of the cylinder included between the nozzle and the vane; it is somewhat equivalent to the "extrados" on a classical wing. A lifting vector 5 is generated approximately perpendicular to the chord of the useful segment 4. The rotating cylinder 1 together with the nozzle 2 and the vane constitute the basis of this invention. For the practical operation of an aircraft, the lift will come from several modules which will all contain these three aforementioned basic elements and optionally some additional devices and arrangements as described hereinafter.

Figure 2:
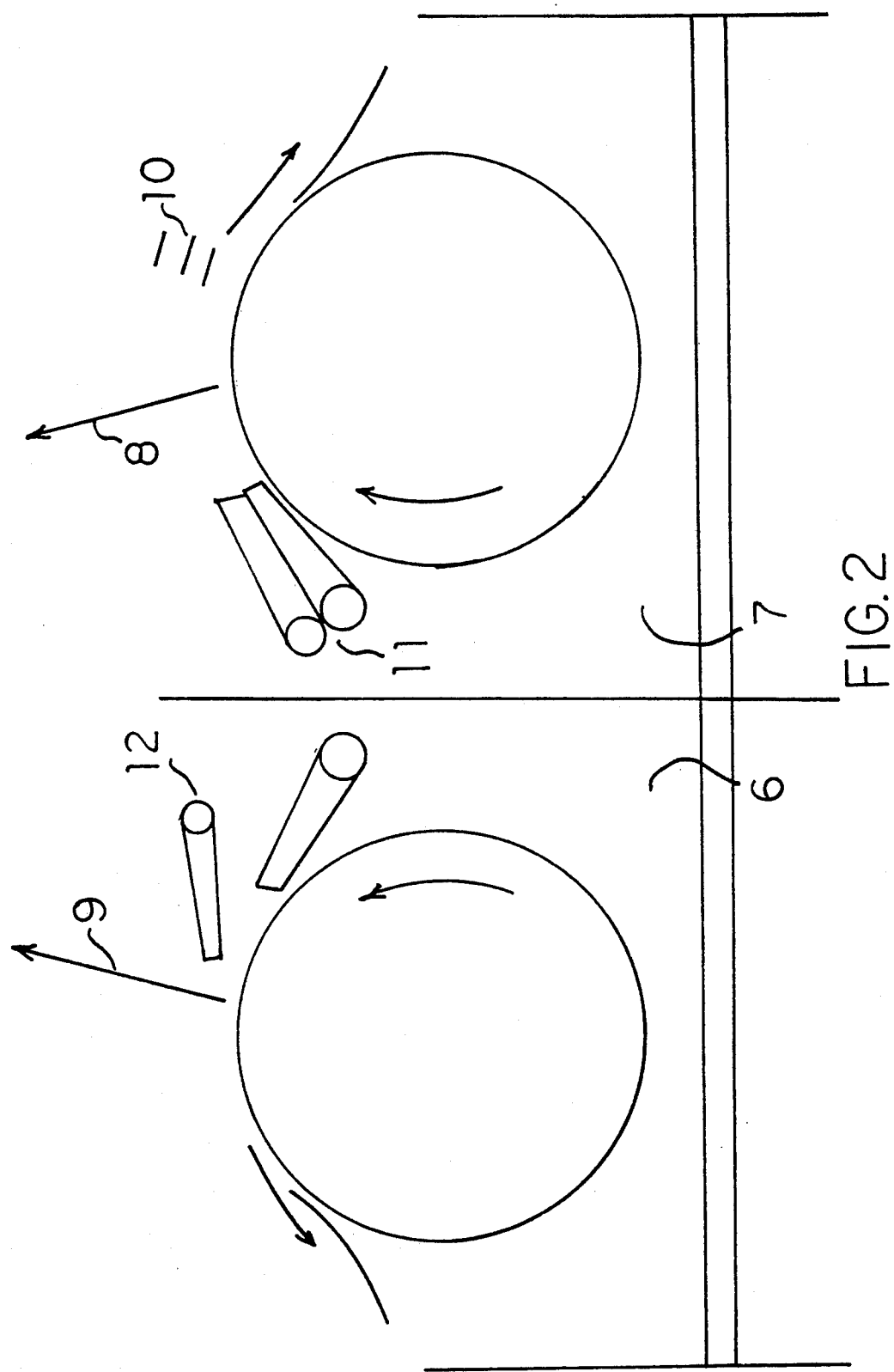
FIG. 2 represents a cross section of an aircraft equipped with a pair of rotating cylinders and showing (a) devices to lessen the turbulence in the air stream generated by the nozzles, (b) a geometric arrangement to cancel the residual horizontal thrust generated by the nozzles, and (c) an example of a built-in stabilizing dihedral.

FIG. 2 is a simplified transverse cross sectional view of an aircraft (seen from aft) with two parallel lines of lifting modules 6 and 7. As the nozzles of these modules are blowing symmetrically in opposite directions, their residual horizontal thrusts cancel each other while their vertical lifts (parallel to one another) are added together. This is one way to cancel the horizontal thrust of the nozzles; another is described in connection with FIG. 4. In FIG. 2, a reciprocal arrangement is also shown in which the useful segment of each module has been slightly tilted toward its companion. Since the lift vectors 8 and 9 of the two modules converge, a built-in anti-roll stabilizing dihedral is produced. The starboard side module 7 has some narrow rectifying blades 10 which reduce the turbulence of the air jet. This module also has two stacked nozzles 11 which discharge two stratified streams. As the upper stream is slower, this helps alleviate turbulence. Module 6 has a secondary downstream nozzle 12 which can re-energize the flux and reduce turbulence. It must be understood that a pair of modules would not be asymmetrical in a real aircraft; the asymmetry occurs only for the sake of simplifying the drawings.

Figure 3:
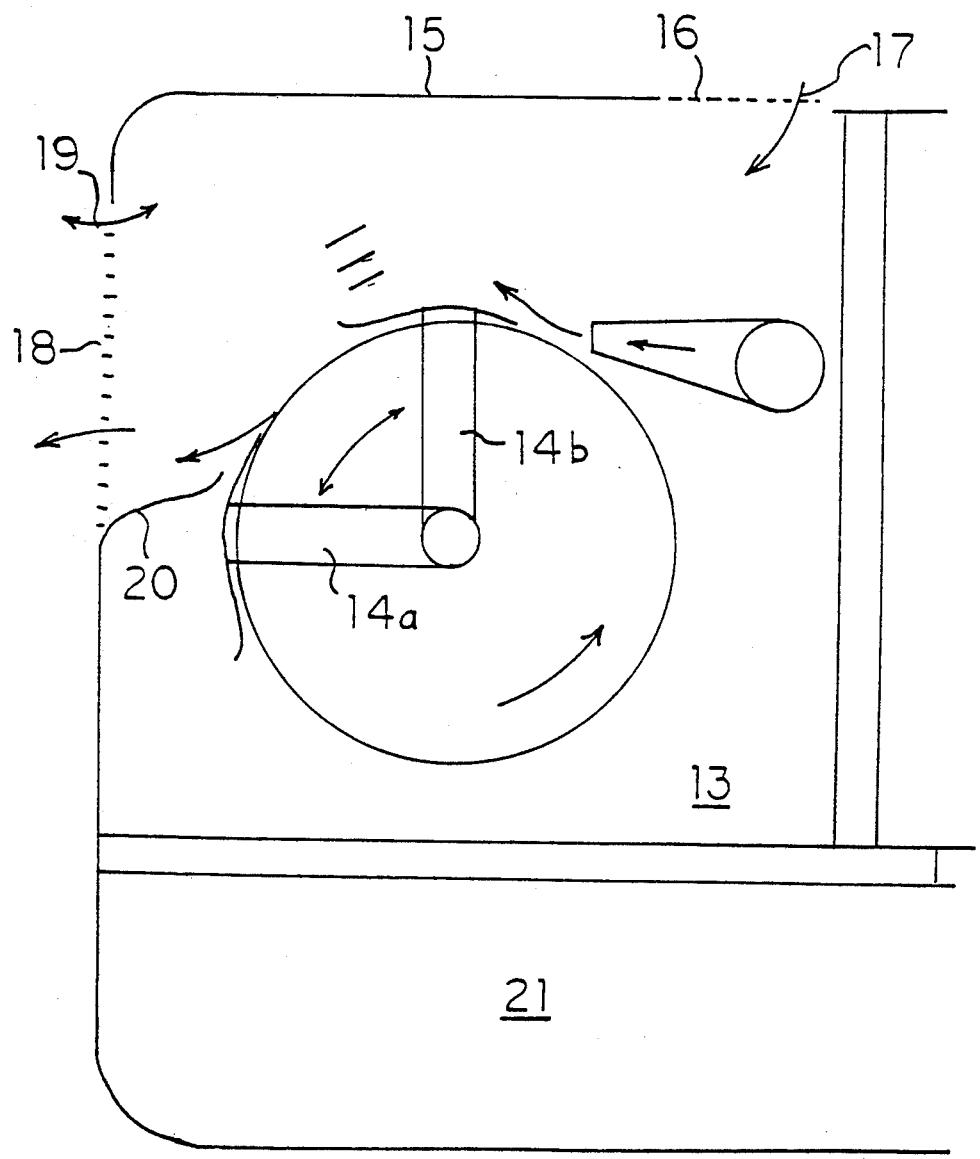
FIG. 3 is a cross section of a lifting module which illustrates simultaneously (a) a vane used as a control and (b) protecting walls and air-circulation louvers.

FIG. 3 shows one module 13 which is a refinement of modules 6 and 7 shown in FIG. 2. This is a transversal cross section as seen from aft; only the starboard module is shown as it is perfectly symmetrical to the port side one. A mobile vane in its extended position 14a defines a useful segment having a largest surface area. The very same mobile vane, when moved by the pilot to a position 14b closer to the nozzle, defines a useful segment having a smallest surface area and an extremely reduced lift.

Walls 15 protect the air jet from the wind generated by forward movement of the aircraft. Louvers 16 admit air that will feed the secondary air streams induced by the jet of air exiting the nozzle. Additional louvers 18 permit the air streams to leave the enclosed space after they have fulfilled their role above the useful segment. Furthermore, louvers 18 are large enough to permit an alternating flux 19 that makes possible an equilibrium between the pressure inside the walls and the atmospheric pressure. A profiled surface 20 helps the air streams leave through the louvers. The inlet of the blowing pumps can be located there to benefit from the residual energy of the air streams after they have swept the useful segment and have left the vane. The load to be lifted may be located in space 21, directly underneath the lifting modules.

Figure 4:
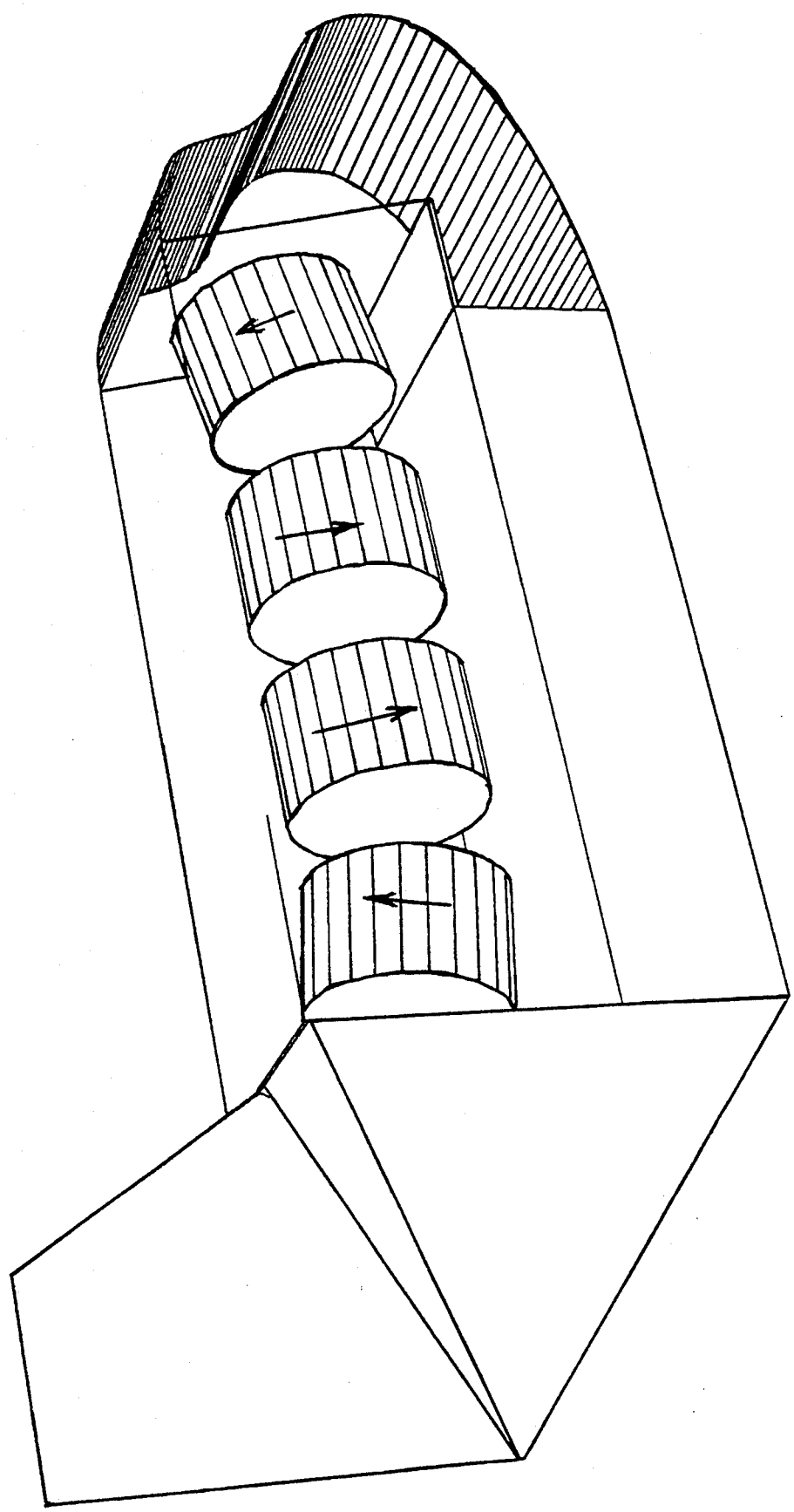
FIG. 4 is a perspective cut away view of a vehicle equipped with lifting modules aligned along a single axis but with alternating spin orientations, which constitutes another geometrical method of cancelling horizontal residual thrust.

FIG. 4 is a view of an aircraft where the lifting modules are arranged longitudinally in one single row. The arrows show that two modules have a jet flowing in one direction while the two other jets flow exactly in the opposite direction; this balances their horizontal residual thrusts without disturbing the modules' vertical lift.

FIGS. 5A–5D show three lift diagrams of an aircraft as seen from the side and one drawing synthesizing these concepts. In each one of the three diagrams, bars and vectors (e.g. 22) symbolize a row of four lifting cylinders aligned longitudinally, (if desired, there may be a second row identical to the one shown).

Figure 5A:
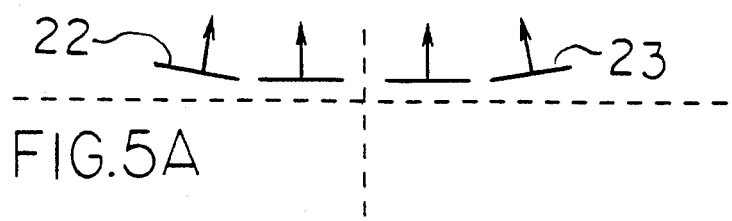
FIGS. 5A–5D are simplified sketches representing (a) several different ways of tilting lifting modules and (b) the role of compensation modules.

In FIG. 5A, the axis of the aft and bow cylinders 22 and 23 have been raised in a symmetrical way, making their vectors converge slightly and thus lessening their useful vertical lift but in return creating a very useful built-in anti-pitching dihedral.

Figure 5B:
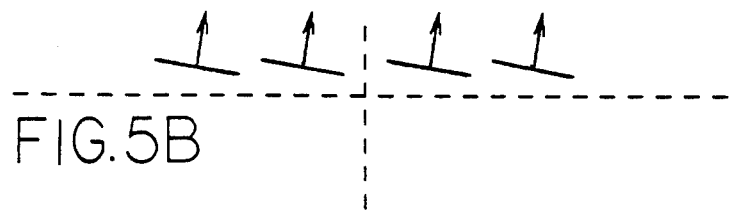

In FIG. 5B, all four lifting cylinders have been tilted slightly toward the bow. This arrangement (similar to the tilting of the rotors of helicopters) permits the use of an excess of vertical lift (controlled by the pilot) to introduce a horizontal component in the vectors which will then make the aircraft move horizontally while keeping the fuselage horizontal (in order to lessen drag). Of course, there is a price to pay in return for this advantage; during stationary flight, and during takeoff or landing, it is essential that the lifting vector be perfectly vertical (without any horizontal component), which implies that the aircraft be nose-up, with the nose wheel gear 26 being preferably overextended. The reference line 27 under the landing gear represents the ground at time of landing, the aircraft being actually nose-up.

Figure 5C:
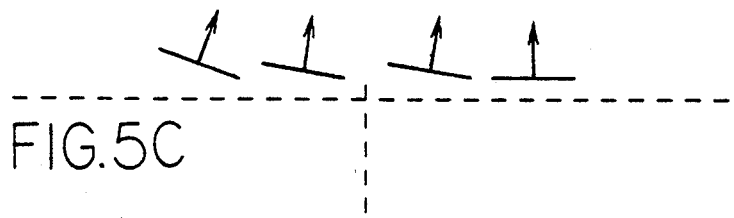
Figure 5D:
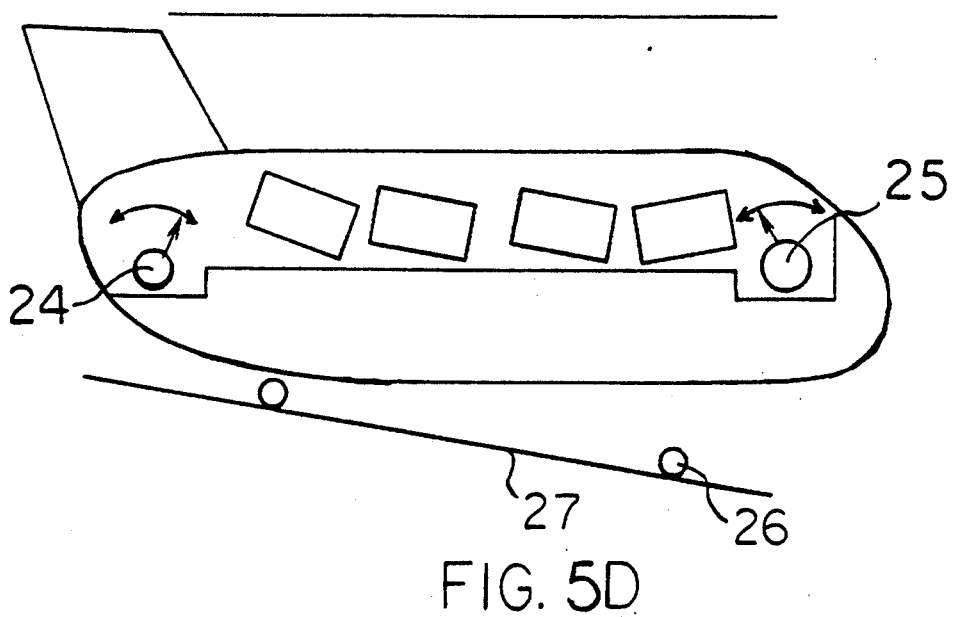

In FIG. 5C, the features of FIG. 5A (dihedral) have been superimposed on those of FIG. 5B (horizontal movement) in order to provide an aircraft which can at the same time go forward and be stable. However, such a simplistic and mechanical superimposition would be stable only in vertical or very slow flight, with a tendency to nosedive in fast flight. To counter this tendency, in FIG. 5D, the bow modules have been raised slightly to maintain a true dihedral. This is presently the most preferred embodiment for this invention. In FIG. 5D, fore and aft compensation modules 24 and 25 aligned laterally are also provided. The vectors of modules 24 and 25 show that the pilot can command variations in both the direction and strength of the lifting vectors of these compensation modules.

There are 8 possible ways to control such an aircraft, as follows:

(1) As mentioned in the above patent to Grose, an aircraft of this general type can also be equipped with classical wings and propellers (or even with a ramjet). At cruising speed, it is then controlled just like a standard airplane, the lifting cylinders being used only for takeoff, stationary flight or landing. In the meantime, the lifting modules can be stopped and the louvers described above can be closed in order to lessen aerodynamic drag.

In contrast, the controls described below are based on variations of the orientation or variations of the intensity of the lift vectors of the rotating cylinders.

(2) As mentioned by Grose, it is possible to change the intensity of the lift of a cylinder by changing the speed of its rotations. However, as the lifting cylinders are turning at several thousand revolutions/minute, their inertia is significantly large. Thus any variation in their angular speed (and their lift) will occur slowly. Moreover, any slowing of the cylinder speed has a sharp effect on the lift coefficient without a commensurate economy of energy. For these reasons, this mode of control is not preferred.

(3) As also mentioned by Grose, control can be achieved by variations of the speed of blown jets. This mode is brisker than the preceding one but less quick than the following and will be used mainly to implement long-term needs of the pilot (e.g. changing the climb rate). In addition to these known control methods, I have also provided the following.

(4) Control through the vane.

The vane which carries the air flux away from the surface of the cylinder at the end of the useful segment can be made mobile so that, under the command of the pilot, it follows a trajectory parallel to the surface of the cylinder and arrives close to the nozzle. Of course, the vane coming close to the nozzle lessens the lifting surface, suppressing totally the lift if it comes in contact with the nozzle. As a secondary effect, this reduction of the lifting surface is accompanied by a progressive reorientation of the lifting vector. As this vane can be moved extremely fast while using very little energy, it presently constitutes the preferred mode of control of this invention. For example: when the jets are blowing at their maximum speed and the cylinders are rotating at their optimum speed, movement of the vanes close to the nozzles causes the lift of these modules to become practically nil. If desired, the pilot can reposition the vane to the other end of its trajectory and thus achieve maximum lift almost instantly, without imposing any shock on the motors. No conventional aircraft has this versatility, this reserve of lift accessible instantly.

(5) Control through nozzle and vane moving together.

A nozzle and its associated vane can move together, in unison, on the pilot's command. This brings about a reorientation of the lift vector without any change in the strength of this vector.

(6) Control through a small lateral useful segment.

A small useful segment and all its components (small nozzle, small vane, etc.) can be installed on the side of a large standard cylinder which is otherwise dedicated to vertical lift with the standard components (standard nozzle, standard vane, etc.). Such a small lateral useful segment will generate a horizontal lifting vector which will be useful mainly to control the lateral motion of the aircraft.

These lateral useful segments and their horizontal vectors act independently from the standard modules intended to provide vertical lift. Thus, when an aircraft is in stabilized vertical flight, the pilot can position the aircraft through the use of those small lateral useful segment without perturbing the general equilibrium of the lifting modules or the attitude of the aircraft. This should simplify and alleviate the pilot's work. The lateral useful segment will be used mainly at takeoff, for static flight, for nap-of-the-earth manoeuvres and for landing.

(7) Control through compensation modules.

The aforementioned compensation modules installed fore and aft can be equipped with very versatile devices for controlling the intensity and the orientation of their respective lifts (through a nozzle and a vane that are both mobile). The pilot can move either the vane alone or the vane and the nozzle together. These compensation modules can be used first to compensate for displacements of the center of gravity, permitting important aft-bow displacements of the center of gravity without affecting the attitude of the aircraft. These modules can also be used deliberately to influence the attitude of the aircraft and control its movements or they can be disposed in a dihedral pattern and become another part of the stabilizing mechanism of this type of aircraft. Finally, the lift of these modules can be tilted forward and thus become part of the propelling power of the aircraft. Several of these functions can be used simultaneously, preferably when the pilot is assisted by a computer.

(8) Directional louvers.

The aforementioned exit louvers can be oriented by the pilot, thus deflecting the residual air stream that remains after the vane. Variations of the angle of the louvers can impart a certain control over the aircraft.

While the previous description has been exclusively concerned with the use of lift modules according to the present invention provided in an aircraft, the modules may be used for other purposes, e.g. as indicated below.

Crane

Figure 6:
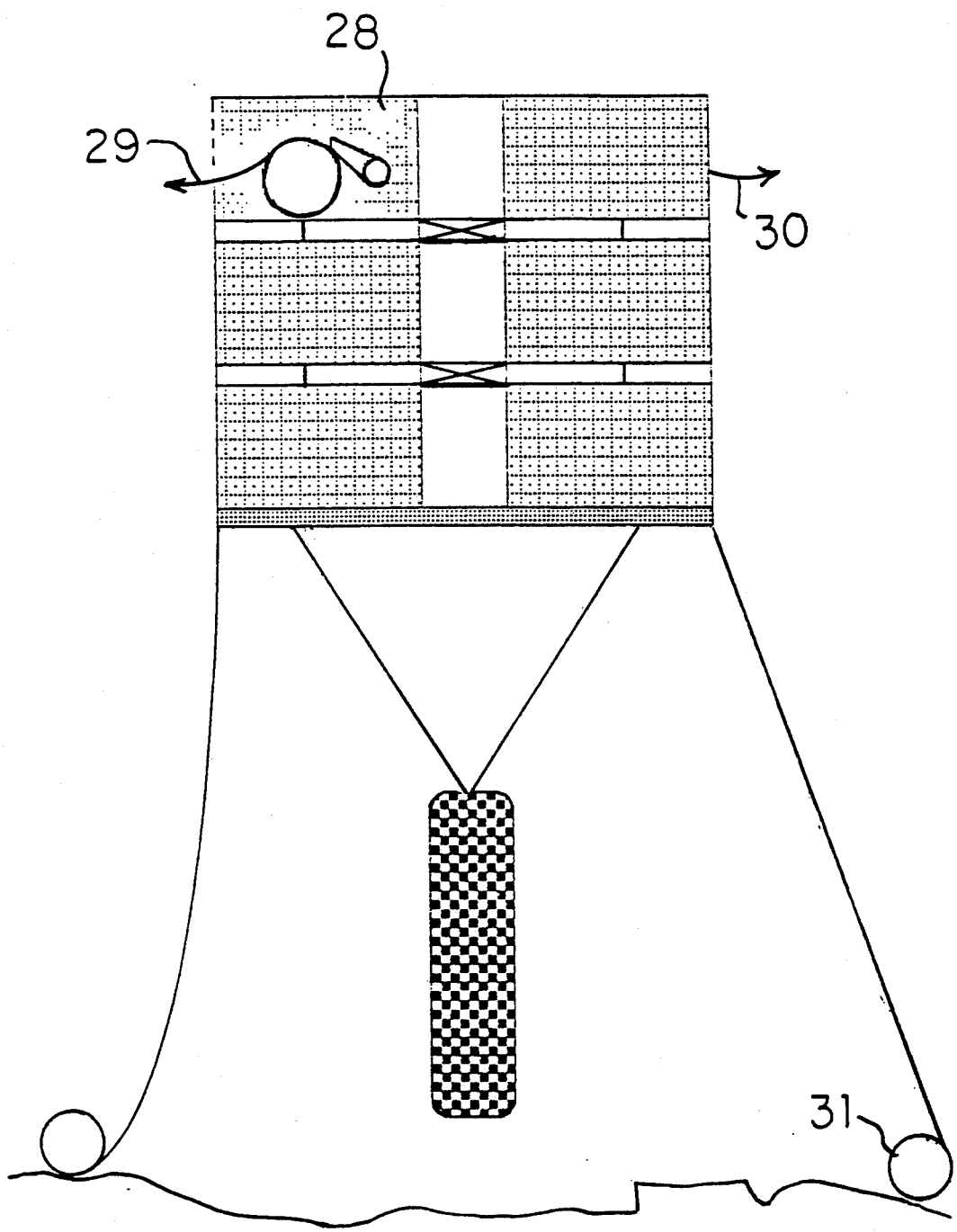
FIG. 6 represents the application of the present invention to a lifting crane.

FIG. 6 represents a crane which makes use of the present invention. In this case, lifting modules 28 are stacked one on top of the other while at the same time they are opposed face to face in order to cancel the horizontal thrust of their jets. Arrows 29 and 30 represent horizontal residual jets flowing in opposite directions and thus cancelling each other out. For some manoeuvres (such as precise positioning, wind countering, etc.), this crane can be positioned above its final destination through cables and winches 31 on the ground. Of course, when the crane is carrying no load, the lifting modules located below the center of gravity are slowed or shut down.

Motor Modules

Finally, an aforementioned "lifting" module can be tilted 90 degrees and thus become a "propelling" module. When installed in front of an aircraft, such a moving module plays a role equivalent to that of a propeller. As the lines of flow of the displacement wind can be made to coincide with the blown air stream coming out from the nozzle, it becomes useless to protect the basic elements (nozzles, cylinder, vane) with walls and louvers.

What I claim is:

1. A device for creating lift, which comprises:
   a cylinder having an outer surface;
   means for rotating the cylinder in a predetermined direction;
   first nozzle means having an outlet immediately adjacent to said outer surface for causing a stream of air to impinge generally tangentially directly onto said outer surface of said cylinder in such a direction that said stream of air and said outer surface move in substantially the same direction; and
   vane means for carrying said stream of air away from said cylinder;
   said vane means for carrying said stream of air away from said cylinder;
   said vane means being separated from said outlet from said first nozzle means circumferentially around said outer surface in said predetermined direction of rotation of said cylinder by a distance which defines only a limited area of said outer surface capable in use of creating lift with minimal drag and turbulence; and
   said first nozzle means being positioned and orientated relative to said cylinder such that substantially no air issuing from said first nozzle means contacts said surface of said cylinder except in said limited area of said surface.

2. A device according to claim 1 wherein said vane means is separated from said first nozzle around the surface of said cylinder by an angular distance of about 60°.

3. A device according to claim 1 further comprising a housing surrounding said cylinder, first nozzle means and vane means in order to substantially shield said cylinder from air currents when said device is in motion, said housing having at least one opening large enough to ensure substantial equilibrium between air pressure outside said housing and air pressure inside said housing adjacent to said limited area.

4. A device according to claim 1 further comprising at least one additional nozzle means for directing an additional stream of air over said limited area in substantially the same direction as said direction of movement of said outer surface of said cylinder.

5. A device according to claim 4 wherein said at least one additional nozzle means is positioned radially further from said cylinder than said first nozzle means.

6. A device according to claim 4 wherein said at least one additional nozzle means is positioned circumferentially between said first nozzle means and said vane means.

7. A device according to claim 1 including at least one rectifying vane positioned adjacent to said limited area of said cylinder within said stream of air to reduce turbulence in said stream of air.

8. A device according to claim 1 wherein said vane means is movable around said outer surface of said cylinder in order to vary said distance from said first nozzle means to said vane means, and as a consequence to vary said lift created over said limited area of said surface.

9. A device according to claim 1 wherein said cylinder is rotatable about a central axis, and wherein said first nozzle means and said vane means are rotatable in unison about said central axis in order to move the orientation of said lift created over said limited area around said axis.

10. An aircraft having a body and at least one device for creating lift to raise said body from a supporting surface, wherein said device for creating lift comprises:
a cylinder having an outer surface;
means for rotating the cylinder in a predetermined direction;
first nozzle means having an outlet immediately adjacent to said outer surface for causing a stream of air to impinge generally tangentially directly onto said outer surface of said cylinder in such a direction that said stream of air and said outer surface move in substantially the same direction; and
vane means for carrying said stream of air away from said cylinder;
said vane means being separated from said outlet from said first nozzle means circumferentially around said outer surface in said predetermined direction of rotation of said cylinder by a distance which defines only a limited area of said outer surface capable in use of creating lift with minimal drag and turbulence; and
said first nozzle means being positioned and orientated relative to said cylinder such that substantially no air issuing from said first nozzle means contacts said surface of said cylinder except in said limited area of said surface.

11. An aircraft according to claim 10 wherein said body is elongated and has a longitudinal axis, and wherein at least two devices for creating lift are provided and mutually aligned along said axis with rotational axes of said cylinders generally parallel to said axis of said aircraft body.

12. An aircraft according to claim 11 having an even number of said devices for creating lift, wherein said cylinders of one half of said devices rotate in one direction and the cylinders of a remaining half of said devices rotate in an opposite direction.

13. An aircraft according to claim 10 wherein said body is elongated and has a longitudinal axis, and wherein at least two devices for creating lift are provided and mutually aligned along said axis with rotational axes of said cylinders of at least two of said devices tilted at an angle to said axis of said body to create a stabilizing dihedral of lift vectors.

14. An aircraft according to claim 10 wherein said body has a central vertical longitudinal plane and wherein at least one pair of said devices for creating lift is provided in said body with the devices of each said pair provided on opposite sides of said vertical plane.

15. An aircraft according to claim 14 wherein said cylinders of said devices on said opposite sides of said vertical plane rotate in opposite directions.

16. An aircraft according to claim 14 wherein said nozzle means and said vane means of said devices on opposite sides of said vertical plane are orientated relative to said cylinders such that lift generated by said cylinders is directed partially inwardly towards said vertical plane to create a stabilizing dihedral of lift vectors.

* * * * *